(12) United States Patent
Mayumi et al.

(10) Patent No.: US 9,365,757 B2
(45) Date of Patent: Jun. 14, 2016

(54) UV-CURABLE ADHESIVE ORGANOPOLYSILOXANE COMPOSITION

(71) Applicant: Shin-Etsu Chemical Co., Ltd., Chiyoda-ku, Tokyo (JP)

(72) Inventors: Yuka Mayumi, Annaka (JP); Masayuki Ikeno, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/532,133

(22) Filed: Nov. 4, 2014

(65) Prior Publication Data
US 2015/0124338 A1 May 7, 2015

(30) Foreign Application Priority Data

Nov. 5, 2013 (JP) ................. 2013-229244

(51) Int. Cl.
*C09J 183/04* (2006.01)
*G02B 19/00* (2006.01)
*G02B 3/08* (2006.01)

(52) U.S. Cl.
CPC ................. *C09J 183/04* (2013.01); *G02B 3/08* (2013.01); *G02B 19/0009* (2013.01); *G02B 19/0042* (2013.01)

(58) Field of Classification Search
CPC ......... C08G 77/12; C08G 77/20; B01J 23/40; C09J 183/04; G02B 19/0042
See application file for complete search history.

(56) References Cited

U.S. PATENT DOCUMENTS

| 7,701,648 B2 | 4/2010 | Amano et al. |
| 2003/0235383 A1* | 12/2003 | Gardner .............. C03C 17/3405 385/129 |

FOREIGN PATENT DOCUMENTS

JP        2007-79082 A      3/2007

* cited by examiner

*Primary Examiner* — Kuo-Liang Peng
(74) *Attorney, Agent, or Firm* — Birch, Stewart, Kolasch & Birch, LLP

(57) ABSTRACT

A UV-curable adhesive organopolysiloxane composition is provided comprising (A) (A-1) an alkenyl-containing linear organopolysiloxane and (A-2) a three-dimensional network alkenyl-containing organopolysiloxane resin comprising $R^1_2R^2SiO_{3/2}$, $R^1_3SiO_{1/2}$ and $SiO_2$ units, wherein $R^1$ is a monovalent hydrocarbon group exclusive of alkenyl and $R^2$ is alkenyl, (B) (B-1) an alkoxy-free organohydrogenpolysiloxane and (B-2) an organohydrogenpolysiloxane containing at least one trialkoxysilyl group bonded to silicon via alkylene, (C) a photoactive platinum complex catalyst, and (D) a branched organopolysiloxane oligomer comprising $R^1_2R^2SiO_{1/2}$ and/or $R^1_3SiO_{1/2}$ units and $R^1SiO_{3/2}$ units, but not $SiO_2$ units.

6 Claims, No Drawings

UV-CURABLE ADHESIVE ORGANOPOLYSILOXANE COMPOSITION

CROSS-REFERENCE TO RELATED APPLICATION

This non-provisional application claims priority under 35 U.S.C. §119(a) on Patent Application No. 2013-229244 filed in Japan on Nov. 5, 2013, the entire contents of which are hereby incorporated by reference.

TECHNICAL FIELD

This invention relates to a UV-curable adhesive organopolysiloxane composition which is useful in forming Fresnel lenses for concentrator solar cells or the like, and more particularly, to a silicone resin composition affording a cured product having high hardness and improved self-adhesion to glass.

BACKGROUND ART

Concentrator photovoltaic systems are known to convert light energy to electric energy at a high efficiency while Fresnel lenses are used for concentration. In the prior art, Fresnel lenses are manufactured by a templating method of heating and compressing thermoplastic resin in a template mold. This method has the drawback of time-consuming molding because the thermoplastic resin is heated and die-pressed, and then cooled below the heat deflection temperature. Since the mold is exposed to high temperature, the mold surface is oxidized. This causes changes to the prism topography of Fresnel lenses, adversely affecting the reproducibility of Fresnel lenses. It is thus recently proposed to fill the lens-forming mold with a UV- or EB-curable resin which can be processed under relatively mild conditions, and to cure the resin for shaping. This method had the benefit of high production efficiency because temperature changes are not utilised.

The method using curable resin, however, requires to laminate a transparent plastic film as a support substrate to one surface of the curable resin in order to increase the strength of Fresnel lenses. The production method is by filling a mold with a curable resin, placing a transparent plastic film so as to cover the surface of the curable resin, and then curing the resin. The Fresnel lens thus produced is likely to curl due to polymerization shrinkage of the curable resin, which raises problems including lenses of unacceptable quality and low yields of production. Additionally, a post-working step for curl correction is necessary. When the Fresnel lens is parted from the mold, smooth parting is obstructed because the stiff substrate is laminated thereto. This often leads to the drawback that opaque spots form on the Fresnel lens surface. Further, since the support substrate is in direct contact with the curable resin during production, a certain type of resin of which the support substrate is composed can undergo swelling or creasing under the influence of the UV- or EB-curable resin. Thus a choice of support substrate resin is extremely limited, There are proposed various Fresnel lenses which address the above problems or eliminate the drawbacks. For example, one known silicone composition utilizes an acryloyl group as photo-curable functionality so that the composition may be cured by UV exposure. However, solar cells are mainly installed outdoor, resins of certain type encounter diverse troubles. For example, an acrylic resin is used in JP-A 2007-079082. Because of moisture permeability, the acrylic resin allows for penetration of water from air or rain. If water is frozen with a lowering of ambient temperature, the resin is cracked or otherwise damaged.

CITATION LIST

Patent Document 1; JP-A 2007-079082 (U.S. Pat. No. 7,701,648)

SUMMARY OF INVENTION

An object of the invention is to provide a UV-curable or addition reaction curable, adhesive organopolysiloxane composition which overcomes the problems of the prior art, is useful as a Fresnel lens-forming material having heat resistance and durability, and has advantages including adhesion to glass substrates, freedom of polymer design to control hardness, and fast cure on UV exposure and a Fresnel lens for use in concentrator solar power systems.

In one aspect, the invention provides a UV-curable adhesive organopolysiloxane composition comprising (A) (A-1) 50 to 90% by weight, based on component (A), of a linear organopolysiloxane having at least two silicon-bonded alkenyl groups per molecule and (A-2) 10 to 50% by weight, based on component (A), of a three-dimensional network organopolysiloxane resin comprising $R^1_2R^2SiO_{1/2}$ units, $R^1_3SiO_{1/2}$ units and $SiO_2$ units, wherein $R^1$ is an unsubstituted or halo-substituted monovalent hydrocarbon group exclusive of alkenyl and $R^2$ is an alkenyl group, in a molar ratio $(R^1_2R^2SiO_{1/2}+R^1_3SiO_{1/2})/SiO_2$ of 0.5/1 to 1.5/1, and containing $5\times10^{-3}$ to $1\times10^{-4}$ mol/g of alkenyl groups, the sum of components (A-1) and (A-2) being 100% by weight.

(B) (B-1) an organohydrogenpolysiloxane containing at least two silicon-bonded hydrogen atoms per molecule, but not alkoxy group, in an amount to give a molar ratio of silicon-bonded hydrogen in component (B-1) to the total of alkenyl in components (A) and (D) of 0.1/1 to 5.0/1, and (B-2) an organohydrogenpolysiloxane containing at least one trialkoxysilyl group bonded to silicon via an alkylene group and at least one silicon-bonded hydrogen atom per molecule, in an amount to give a molar ratio of silicon-bonded hydrogen in component (B-2) to the total of alkenyl groups in components (A) and (D) of 0.05/1 to 2.0/1, with the proviso that a molar ratio of silicon-bonded hydrogen in component (B) to the total of alkenyl in components (A) and (D) is from 0.5/1 to 7.0/1, (C) an effective amount of a photoactive platinum complex catalyst, and (D) a branched organopolysiloxane oligomer comprising $R^1_2R^2SiO_{1/2}$ units and $R^1SiO_{3/2}$ units, or $R^1_2R^2SiO_{1/2}$ units, $R^1_3SiO_{1/2}$ units and $R^1SiO_{3/2}$ units, but not $SiO_2$ units, wherein $R^1$ is an unsubstituted or halo-substituted monovalent hydrocarbon group exclusive of alkenyl and $R^2$ is an alkenyl group, and containing at least two alkenyl groups per molecule, in an amount to give a molar ratio of alkenyl in component (D) to the total of alkenyl in components (A) and (D) of 0.1/1 to 0.6/1.

In a preferred embodiment, the photoactive platinum complex catalyst is a β-diketone platinum complex or a platinum complex having a cyclic diene compound as ligand. More preferably, the photoactive platinum complex catalyst is one or more members selected from the group consisting of trimethyl(acetylacetonato)platinum complex, trimethyli(2,4-pentanedionate)platinum complex, trimethyl (3,5-heptanedionate)platinum complex, trimethyl(methylacetoacetate)platinum complex, bis(2,4-pentanedionato)platinum complex, bis(2,4-hexanedionato)platinum complex,
bis(2,4-heptanedionato)platinum complex,
bis(3,5-heptanedionato)platinum complex,
bis (1-phenyl-1,3-butanedionato)platinum complex,
bis(1,3-diphenyl-1,3-propanedionato)platinum complex,
(1,5-cyclooctadienyl)dimethyl platinum complex,
(1,5-cyclooctadienyl)diphenyl platinum complex,
(1,5-cyclooctadienyl)dipropyl platinum complex,
(2,5-norbornadiene)dimethyl platinum complex,
(2,5-norbornadiene)diphenyl platinum complex,
(cyclopentadienyl)dimethyl platinum complex,
(methylcyclopentadienyl)diethyl platinum complex,
(trimethylsilylcyclopentadlenyl)diphenyl platinum complex,
(methyleycloocta-1,5-dienyl)diethyl platinum complex,
(cyclopentadienyl)trimethyi platinum complex,
(cyclopentadienyl)ethyldimethyl platinum complex,
(cyclopentadienyl)acetyldimethyl platinum complex,
(methylcyclopentadienyl)trimethyl platinum complex,
(methylcyclopentadienyl)trihexyl platinum complex,
(trimethylsilylcyclopentadienyl)trimethyl platinum complex,
(dimethylphenylsilylcyclopentadienyl)triphenyl platinum complex,
and (cyclopentadienyl) dimethyltrimethylsilylmethyl platinum complex.

Typically, the composition is to form Fresnel lenses for concentrator solar power systems. Most often the composition is to be cured and bonded to a glass substrate.

In another aspect, the invention provides a Fresnel lens for concentrator solar power systems comprising a glass substrate and the W-curable adhesive organopolysiioxane composition cured and bonded to the substrate.

Advantageous Effects of Invention

The organopolysiloxane composition of the invention has a sufficient pot life at room temperature. Upon brief UV exposure, the composition is cured to glass. The cured silicone product has desired hardness and other physical properties as Fresnel lens-forming material for concentrator solar power systems.

DESCRIPTION OF PREFERRED EMBODIMENTS

First, components of the composition are described in detail.

Component (A)

Component (A) consists of alkenyl-containing organopolysiloxanes (A-1) an alkenyl-containing linear diorganopolyslosane and (A-2) an alkenyl-containing organopolysiloxane resin.

Component (A-1) is an organopolysiloxane which serves as a base polymer of the composition. It is a linear organopolysiloxane having at least two silicon-bonded alkenyl groups per molecule, specifically 2 to 50, preferably 2 to 20 silicon-bonded alkenyl groups. Typically it is a linear diorganopolysiloxane having a backbone consisting of recurring diorganosiloxane units and capped with a triorganosiloxy group at both ends of its molecular chain.

Component (A-2) is an organopolysiloxane resin of three-dimensional network structure comprising $R^1_2R^2SiO_{1/2}$ units, $R^1_3SiO_{3/2}$ units and $SiO_2$ units, such that a molar ratio of the sum of $R^1_2R^2SiO_{1/2}$ units and $R^1_3SiO_{1/2}$ units to $SiO_2$ units, that is, $(R^1_2R^2SiO_{1/2}+R^1_3SiO_{1/2})/SiO_2$ is in a range from 0.5/1 to 1.5/1, preferably from 0.7 to 1.0, and containing $5\times10^{-3}$ to $1\times10^{-4}$ mol/g of alkenyl groups. Herein R1 is an unsubstituted or halo-substituted monovalent hydrocarbon group exclusive of alkenyl and $R^2$ is an alkenyl group. Although the organopolysiloxane resin of three-dimensional network structure as component (A-2) is preferably free of trifunctional siloxane units in the molecule, it is clearly discriminated from the branched organopolysiloxane oligomer as component (D) in that it essentially contains $SiO_2$ units in the molecule.

It is acceptable that the organopolysiloxane resin as component (A-2) further comprise $R^1_2SiO$ units, $R^1R^2SiO$ units, $R^2_2SiO$ units, $R^2SiO_{3/2}$ units and $R^1SiO_{3/2}$ units in addition to the aforementioned units. The content of additional units is preferably up to 30% by weight (0 to 30% by weight), especially up to 20% by weight (0 to 20% by weight) of the organopolysiloxane resin. It is often preferred for consistent reinforcement of the cured composition that the organopolysiloxane resin have a weight average molecular weight (Mw) of 400 to about 100,000, especially 500 to about 30,000. If Mw is too low, the effect of reinforcing the cured composition may be little exerted. If Mw is too high, consistent preparation may be difficult. Notably, throughout the disclosure, the molecular weight or degree of polymerization may be determined as a weight average molecular weight or weight average degree of polymerization versus polystyrene by gel permeation chromatography (GPC) using toluene or tetrahydrofuran (THF) as developing solvent.

Component (A), specifically components (A-1) and (A-2) contain silicon-bonded alkenyl groups. Suitable alkenyl groups include those of 2 to 8 carbon atoms, preferably 2 to 6 carbon atoms, such as vinyl, allyl, butenyl, pentenyl, hexenyl, and heptenyl, with vinyl being most preferred.

With respect to the alkenyl-bonding position in component (A-1), that is, the position of a silicon atom in the molecule to which an alkenyl group is bonded, the alkenyl group may be bonded to a silicon atom at the end of the molecular chain and/or a silicon atom at a non-end position of the molecular chain (midway the molecular chain). Preferably at least alkenyl groups bonded to silicon atoms at both ends of the molecular chain are included. Component (A) contains silicon-bonded organic groups other than the alkenyl groups. Exemplary organic groups are unsubstituted or halo-substituted monovalent hydrocarbon groups, specifically unsubstituted or halo-substituted monovalent hydrocarbon groups of 1 to 10 carbon atoms, preferably 1 to 8 carbon atoms. Examples include alkyl groups such as methyl, ethyl, propyl, butyl, pentyl, hexyl and heptyl, aryl groups such as phenyl, tolyl, xylyl and naphthyl, aralkyl groups such as benzyl and phenethyl, and halo-alkyl groups such as chloromethyl, 3-chloropropyl, and 3,3,3-trifluoropropyl. Inter alia, methyl and phenyl are preferred.

Preferably component (A-1) has a viscosity at 25° C. in the range of 10 to 500,000 mPa·s, more preferably 100 to 100,000 mPa·s, in order that the composition may be easy to handle and work (e.g.., smooth flow) and the cured composition have improved physical properties (e.g., hardness or flexibility, strength, elongation). It is noted throughout the disclosure that the viscosity may be measured at 25° C. by a rotational viscometer such as BL, BH, BS or cone-and-plate type viscometer.

Examples of the organopolysiloxane as component (A-1) include dimethylsiloxane-methylvinylsiloxane copolymers capped at both ends of the molecular chain with trimethylsiloxy, methylvinylpolysiloxane capped at both ends of the molecular chain with trimethylsiloxy, dimethylsiloxane-methylvinylpolysiloxane-methylphenylsiloxane copolymers capped at both ends of the molecular chain with trimethylsiloxy, methylvinylpolysiloxane-methylphenylsiloxane copolymers capped at both ends of the molecular chain with trimethylsiloxy, dimethylsiloxane-methylvinylsiloxane-diphenylsiloxane copolymers capped at both ends of the molecular chain with trimethylsiloxy, dimethylsiloxane-methylvinylsiloxane copolymers capped at one end of the molecular chain with dimethyvinylsiloxy and at the other end with trimethylsiloxy, dimethylpolysiloxane capped at both ends of the molecular chain with dimethylvinylsiloxy, methylvinylpolysiloxane capped at both ends of the molecular chain with dimethylvinylsiloxy, dimethylsiloxane-methylvinylsiloxane copolymers capped at both ends of the molecular chain with dimethylvinylsiloxy, dimethylsiloxane-methylvinylsiloxane-methylphenylsiloxane copolymers capped at both ends of the molecular chain with dimethylvinylsiloxy, dimethylsiloxane-methylvinylsiloxane-diphenylsiloxane copolymers capped at both ends of the molecular chain with dimethylvinylsiloxy, dimethylpolysiloxane capped at both ends of the molecular chain with divinylmethylsiloxy, dimethylpolysiloxane capped at both ends of the molecular chain with trivinylsiloxy, and mixtures comprising two or more of the foregoing.

Examples of the three-dimensional network organopolysiloxane resin as component (A-2) include organopolysiloxane copolymers consisting of siloxane units of $R^1{}_3SiO_{1/2}$, siloxane units of $R^1{}_2R^2SiO_{3/2}$, siloxane units of $R^1{}_2SiO$, and siloxane units of $SiO_2$, organopolysiloxane copolymers consisting of siloxane units of $R^1{}_3SiO_{1/2}$, siloxane units of $R^1{}_2R^2SiO_{1/2}$, and siloxane units of $SiO_2$, organopolysiloxane copolymers consisting of siloxane units of $R^1{}_2SiO_{1/2}$, siloxane units of $R^1{}_2SiO$, and siloxane units of $SiO_2$, and mixtures comprising two or more of the foregoing.

In the formula, $R^1$ is an unsubstituted or halo-substituted monovalent hydrocarbon group exclusive of alkenyl, examples of which include alkyl groups such as methyl, ethyl, propyl, butyl, pentyl, hexyl and heptyl, aryl groups such as phenyl, tolyl, xylyl and naphthyl, aralkyl groups such as benzyl and phenethyl, and halo-alkyl groups such as chloromethyl, 3-chloropropyl, and 3,3,3-trifluoropropyl. $R^2$ is an alkenyl group such as vinyl, allyl, butenyl, pantenyl, hexenyl or heptenyl.

Components (A-1) and (A-2) are combined such that a weight ratio of (A-1)/(A-2) is in the range from 90/10 to 50/50, more preferably from 85/15 to 60/40. Within the range, the composition is easy to handle and work (e.g., smooth flow) and the cured composition has improved physical properties (e.g., hardness or flexibility, strength, elongation). Outside the range, the composition is awkward to handle and work and the cured composition has degraded physical properties, failing in precision light condensation and adhesion to glass and other substrates.

Component (B)

Component (B) consists of organohydrogenpolysiloxanes; (B-1) an alkoxy-free organohydrogenpolysiloxane and (B-2) a trialkoxysilyl-containing organohydrogenpolysiloxane.

Component (B-1), which serves as crosslinker in the composition, is an organohydrogenpolysiloxane containing at least two silicon-bonded hydrogen atoms per molecule, but not alkoxy group. It is clearly discriminated from component (B-2) in that no alkoxy group is contained in the molecule.

The organohydrogenpolysiloxane as component (B-1) serves as crosslinker by reacting with component (A), specifically components (A-1) and (A-2). Its molecular structure is not particularly limited. That is, the organohydrogenpolysiloxane may be linear, partially branched linear, cyclic, branched or three-dimensional network (resinous) as manufactured in the prior art. The organohydrogenpolysiloxane should contain at least two, preferably at least three silicon-bonded hydrogen atoms (hydrosilyl or SiH groups) per molecule. Typically it contains 2 to about 300 SiH groups, preferably 3 to about 200 SiH groups, and more preferably 4 to about 100 SiH groups. The organohydrogenpolysiloxane typically has the average compositional formula (1).

$$R^4{}_b H_c SiO_{(4-b-c)/2} \quad (1)$$

In formula (1), $R^4$ is a silicon-bonded, substituted or unsubstituted monovalent hydrocarbon group free of aliphatic unsaturation. Examples of the substituted or unsubstituted monovalent hydrocarbon groups, preferably of 1 to 10 carbon atoms, include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; and substituted forms of the foregoing groups in which some or all hydrogen atoms are substituted by halogen (e.g., fluorine, bromine or chlorine) such as chloromethyl, chloropropyl, bromoethyl, and trifluoropropyl. Of these monovalent hydrocarbon groups of $R^4$, alkyl and aryl groups are preferred, with methyl and phenyl being most preferred. Letter b is a positive number of 0.7 to 2.1, c is a positive number of 0.001 to 1.0, and b+c is 0.8 to 3.0. Preferably, b is 1.0 to 2.0, c is 0.01 to 1.0, and b+c is 1.5 to 2.5.

While the organohydrogenpolysiloxane contains at least two, preferably at least three SiH groups per molecule, the SiH groups may be positioned at an end or intermediate of the molecular chain or both. The molecular structure of organohydrogenpolysiloxane may be any of linear, partially branched linear, cyclic, branched and three-dimensional network structures. The number of silicon atoms per molecule, that is, degree of polymerization is typically 2 to about 300, preferably 3 to about 200, and more preferably 4 to about 100. Often, an organohydrogenpolysiloxane having a viscosity at 25° C. in the range of 1 to 1,000 mPa·s, more preferably 5 to 500 mPa·s, differently stated, one which is liquid at room temperature is used because the composition is easy to handle and work (e.g., smooth flow) and the cured composition has improved physical properties (e.g., hardness or flexibility, heat resistance).

Examples of the organohydrogenpolysiloxane of formula (1) as component (B-1) include
1,1,3,3-tetramethyldisiloxane,
1,3,5,7-tetramethylcyclotetrasiloxane,
tris(hydrogendimethylsiloxy)methylsilane,
tris (hydrogendimethylsiloxy) phenylsilane,
methylhydrogencyclopolysiloxane,
methylhydrogensiloxane-dimethylsiloxane cyclic copolymers.
methylhydrogenpolysilox capped at both ends with trimethylsiloxy,
dimethylsiloxane-methylhydrogensiloxane copolymers capped at both ends with trimethylsiloxy,
dimethylpolysiloxane capped at both ends with dimethylhydrogensiloxy,
dimethylsiloxane-methylhydrogensiloxane copolymers capped at both ends with dimethylhydrogensiloxy,
methylhydrogensiloxane-diphenylsiloxane copolymers capped at both ends with trimethylsiloxy,
methylhydrogensiloxane-diphenylsiloxane copolymers capped at both ends with trimethylsiloxy,
methylhydrogensiloxane-diphenyl-dimethylsiloxane copolymers capped at both ends with trimethylsiloxy,
methylhydrogensiloxne-diphenylsiloxane-dimethylsiloxane copolymers capped at both ends with dimethylhydrogensiloxy, methylhydrogensiloxane-dimethylsiloxane-methylphenylsiloxane
copolymers capped at both ends with dimethylhydrogensiloxy, copolymers consisting of $(CH_3)_2HSiO_{1/2}$ units, $(CH_3)_3SiO_{1/2}$ units, and $SiO_{4/2}$ units, copolymers consisting of $(CH_3)_2HSiO_{1/2}$ units and $SiO_{4/2}$ units copolymers consisting of $(CH_3)_2HSiO_{1/2}$ units, $SiO_{4/2}$ units, and $(C_6H_5)_3SiO_{1/2}$ units, analogues of the foregoing polymers in which some or all methyl groups are replaced by another alkyl, phenyl or the like. In particular, those organohydrogenpolysiloxanes having the molecular formula (2) are preferred.

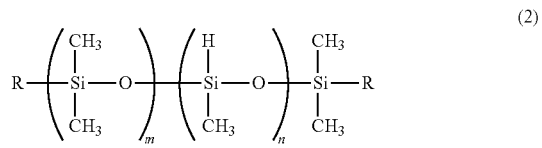

(2)

Herein R is hydrogen or methyl, m and n each are an integer 0≤m and 1≤n, and M+n 1 to 299.

The organohydrogenpolysiloxane as component (B-1) may be prepared by any well-known methods. With one general method taken for instance, it is readily prepared by equilibrating octamethylcyclotetrasiloxane and/or tetramethylcyclodisiloxane and a compound containing a hexamethyldisiloxane or 1,1'-dihydro-2,2',3,3'-tetramethyldisloxane unit to become a terminal group in the presence of a catalyst such as sulfuric acid, trlfluoromethanesulfonic acid or methanesulfonic acid at a temperature of −10° C. to +40° C.

Component (B-1) is used in such an amount that a molar ratio of silicon-bonded hydrogen, in component (B-1) to the total of alkenyl groups in the organopolysiloxanes as components (A) and (D) may range from 0.1/1 to 5.0/1. If this molar ratio is less than 0.1 or more than 5.0, then the composition may not cure to a full extent.

Component (B-2), which serves as adhesion promoter in the composition, is an organohydrogenpolysiloxane containing at least one trialkoxysilyl group bonded to silicon via an alkylene group and at least one silicon-bonded hydrogen atom (i.e., SiH group) per molecule. The number of SiH groups is preferably 2 to 200, more preferably 3 to 100. Also the number of silicon atoms per molecule, i.e., degree of polymerization is typically 2 to about 300, preferably 3 to about 200, and more preferably 4 to about 100.

The organohydrogenpolysiloxane as component (B-2) may be prepared by any well-known methods. With one general method taken for instance, it is readily synthesized by effecting addition reaction of an organosilicon compound having a trialkoxysilyl group and an aliphatic unsaturated hydrocarbon group (e.g., alkenyl, typically vinyl) to a polyorganohydrogensiloxane having at least 3 siloxane units having an Si—H group in the presence of a platinum catalyst, while adjusting such that the total amount of compounds having an aliphatic unsaturated hydrocarbon group may be stoichiometrically less than the moles of Si—H groups in the polyorganohydrogensiloxane. Examples of the organosilicon compound used herein include those shown in the chemical formula (3) wherein Me is methyl.

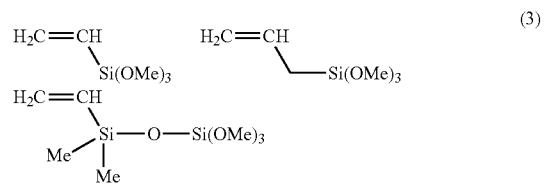

(3)

While the organohydrogenpolysiloxane contains a trialkoxysilyl group bonded to silicon via an alkylene group, a silicon-bonded hydrogen atom, and another organic group, the hydrogen atom may be bonded to a silicon atom at an end or side chain of the molecular chain or both. The other organic group is an unsubstituted or halo-substituted monovalent hydrocarbon group exclusive of alkenyl, examples of which are as enumerated for $R^4$ in component (B-1), with methyl being preferred.

The molecular structure of organohydrogenpolysiloxane as component (B-2) may be any of linear, partially branched linear, cyclic, branched and three-dimensional network structures. The organohydrogenpolysiloxane preferably has a viscosity at 25° C. in the range of 1 to 1,000 mPa·s, more preferably 5 to 500 mPa·s, as measured by a rotational viscometer, because the composition is easy to handle and work (e.g., smooth flow) and the cured composition has improved physical properties (e.g., hardness or flexibility, heat resistance).

Examples of the organohydrogenpolysiloxane as component (B-2) include those shown in the chemical formula (4), alone or in admixture.

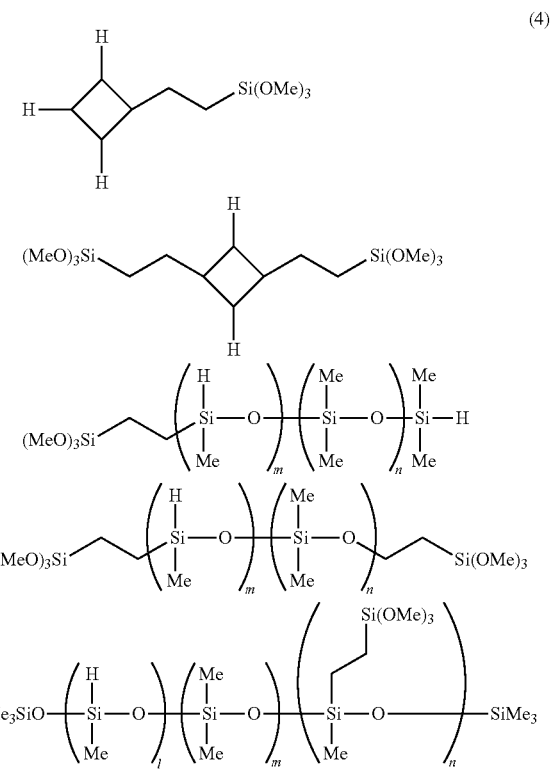

(4)

Herein Me is methyl, 1, m and n are each independently an integer inclusive of 0, m+n is an integer of 1 to 298, and 1+m+n is an integer of 2 to 300.

Component (B-2) is used in such an amount that a molar ratio of silicon-bonded hydrogen in component (B-2) to the total of alkenyl groups in components (A) and (D) may range from 0,05/1 to 2.0/1. If this molar ratio is less than 0.05 or more than 2.0, the composition is not fully adhesive.

It is noted that a molar ratio of the total of silicon-bonded hydrogen atoms in component (B) (that is, components (B-1) and (B-2)) to the total of alkenyl groups in components (A.) and (D) ranges from 0.5/1 to 7.0/1, preferably from 0.5 to 6.0, and more preferably from 1.0 to 5.0, If this molar ratio is less than 0.5 or more them 7.0, then the composition will not cure to a full extent. Further components (B-1) and (B-2) are preferably combined such that the molar ratio of SiH groups in component (B-1) to SiH groups in component (B-2) may range from 90/10 to 50/50, more preferably from 85/15 to 60/40. Within this range, the composition is easy to handle and work (e.g., a viscosity buildup after UV exposure) and the cured composition has improved physical properties (e.g. hardness or flexibility, strength, elongation). Outside the range, some of the advantages including ease of handling or working of the composition, physical properties of the cured composition, precision light concentration, and adhesion to glass or other substrates may be lost.

Component (C)

Component (C) is a photoactive platinum complex catalyst, which exerts a catalytic action of promoting addition reaction among components (A), (B) and (D) when activated upon light exposure. The photoactive platinum complex catalyst as component (C) is preferably a diketone platinum complex or a platinum complex having a cyclic diene compound as ligand.

Examples of the β-diketone platinum complex include
trimethyl (acetylacetonato)platinum complex,
trimethyi(2,4-pentanedionate) platinum complex,
trimethyl(3,5-heptanedionate) platinum complex,
trimethyl(methylacetoacetate) platinum complex,
bis(2,4-pentanedionato)platinum complex,
bis(2,4 -hexanedionato)platinum complex,
bis(2,4-heptanedionato)platinum complex,
bis (3,5-heptanedionato)platinum complex,
bis(1-phenyl-1,3-butanedionato)platinum complex, and
bis(1,3-diphenyl-1,3-propanedionato)platinum complex.
Examples of the platinum complex having a cyclic diene compound as ligand include
(1,5-cyclooctadienyl)dimethyl platinum complex,
(1,5-cyclooctadienyl)diphenyl platinum complex,
(1,5-cyclooctadienyl)dipropyl platinum complex,
(2,5-norbornadiene)dimethyl platinum complex,
(2,5-norbornadiene)diphenyl platinum complex,
(cyclopentadienyl)dimethyl platinum complex,
(methylcyclopentadienyl)diethyl, platinum complex,
(trimethylsilylcyclopentadienyl)diphenyl platinum complex,
(methylcyoloocta-1,5-dienyl)diethyl platinum complex,
(cyclopentadisoyl)trimethyl platinum complex,
(cyclopentadienyl)ethyldimethyl platinum complex,
(cyclopentadienyl)acetyldimethyl platinum complex,
(methylcyclopentadienyl)trimethyl platinum complex,
(methylcyclopentadienyl)trihexyl platinum complex,
(trimethylsilylcyclopentadienyl)trimethyl platinum complex,
(dimethylphenylsilylcyclopentadienyl)triphenyl platinum complex,
and (cyclopentadienyl)dimethyltrimethyisilylmethyl platinum complex.

Component (C) is used in a catalytic or effective amount. Specifically, component (C) is preferably used in such an amount as to give 1 to 5,000 ppm, and more preferably 10 to 500 ppm of platinum metal based on the weight of components (A) and (B) combined. With less than 1 ppm of platinum, the addition reaction may be substantially retarded or cure may not progress.

Component (D)

Component (D), which serves as adhesion promoter in the composition, is a branched organopolysiloxane oligomer comprising $R^1SiO_{3/2}$ units and $R^1{}_2R^2SiO_{1/2}$ units, or $R^1SiO_{3/2}$ units, $R^1{}_2R^2SiO_{1/2}$ units and $R^1{}_3SiO_{1/2}$ units wherein $R^1$ is an unsubstituted or halo-substituted monovalent hydrocarbon group exclusive of alkenyl and $R^2$ is alkenyl, and containing at least two alkenyl groups per molecule. The organopolysiloxane oligomer as component (D) is clearly discriminated from the organopolysiloxane resin as component (A-2) in that if is free of $SiO_2$ units in the molecule.

Preferably a molar ratio of $R^1{}_2R^2SiO_{1/2}$ units and $R^1{}_3SiO_{1/2}$ units to $R^1SiO_{3/2}$ units, that is, $(R^1{}_2R^2SiO_{1/2}+R^1{}_3SiO_{1/2})/R^1SiO_{3/2}$ is in the range from 0.1/1 to 10/1, more preferably 0.5 to 5. Also preferably, the content of alkenyl is 0.0001 to 0.05 mol/g, more preferably 0.0002 to 0.02 mol/g of the organopolysiloxane oligomer. With too less an alkenyl content, the reinforcement of the cured product may be insufficient. With too much an alkenyl content, the composition may not cure to a full extent.

While the organopexysiloxane oligomer should not contain $SiO_2$ units, it may contain $R^1{}_2SiO$ units, $R^1R^2SiO$ units and/or $R^2SiO$ units. It preferably has a viscosity at 25° C. of 1 to 1,000 mPa·s, more preferably 10 to 100 mPa·s, The organopolysiloxane oligomer as component (D) may be prepared by any well-known methods. With one general method taken for instance, it is readily synthesized by stirring a hydrolyzate of methyltrichlorosilane with the aid of water and methanol, and a compound comprising hexamethydisiloxane and/or tetramethyldivinyldisiloxane in the presence of a catalyst such as sulfuric acid, trlfluoromethanesulfonic acid or methanesulfonic acid at a temperature of up to +50° C., and adding dropwise water at a temperature of up to +65° C. thereto, for effecting co-hydrolysis.

Component (D) is used in such an amount that a molar ratio of alkenyl in component (D) to the total of alkenyl in components (A) and (D) may range from 0.1/1 to 0.6/1, If this molar ratio is less than 0.1 or more than 0.6, the composition is not fully adhesive.

Other Components

In addition to components (A) to (D) defined above, the composition of the invention may optionally contain another component, typically a compound which is effective for suppressing and controlling addition reaction cure, known as hydrosilylation reaction retarder. Suitable retarders include phosphorus-containing compounds such as triphenylphosphine, nitrogen-containing compounds such as tributylamine, tetramethylethylenediamine, and benzotriazole, sulfur-containing compounds, acetylene compounds, compounds containing two or more alkenyl groups, hydroperoxy compounds, and maleic acid derivatives. The degree of cure-retarding effect of the retarder largely varies with its chemical structure. Therefore, the amount of the retarder added should be adjusted to an optimum for a particular compound. In general, too less an amount of the retarder added may be ineffective for long-term storage stability at room temperature whereas too much an amount may inhibit cure.

Another optional component is an inorganic filler such as fumed silica or polyorganosilsesquioxane, which may be used in such an amount as not to impair transparency. Such fillers may be surface treated with organosilicon compounds such as organoalkoxysilanes, organochlorosilanes, organosilazanes, and low-molecular-weight siloxane compounds.

The composition may further contain a heat resistance improver, flame retardant or the like.

UV Cure

Desirably the organopolysiloxane adhesive composition may be cured by exposing it to light of wavelength 200 to 500 nm. The lamp for UV irradiation, is not particularly limited as long as it emits UV radiation in a wavelength range of 200 to 500 nm. Suitable UV lamps include low-pressure mercury lamps, medium-pressure mercury lamps, high-pressure mercury lamps, xenon lamps, metal halide lamps and UV LED lamps. Although the exposure dose of UV radiation varies with the type and amount of the photoactive platinum complex used, the dose should, be sufficient to activate the photoactive platinum complex. Preferred is exposure to UV radiation with an intensity of 10 to 1,000 mW/cm$^2$, especially 20 to 400 mW/cm$^2$ for 0.1 second to 5 minutes, especially 0.5 second to 1 minute.

Typically the composition of the invention is used to form a Fresnel lens. The Fresnel lens is used as an illumination system lens in lighthouses, projectors and the like. It is constructed by dividing the curved surface of a spherical lens, and arranging a plurality of prisms in divided segments in a planar manner. As the number of divided segments is increased, the lens becomes thinner. It is a lightweight lens with material saving. The Fresnel lens is widely used as a condensing lens in a solar power generating system.

EXAMPLE

Examples and Comparative Examples are given below for illustrating the invention although the invention is not limited thereto. In Examples, all parts are by weight (pbw), and the viscosity is measured at 25° C. by a rotational viscometer.

Specific compounds, expressed by abbreviations, used as components (A) to (E) are identified below. Vi stands for vinyl and Me for methyl.

Component (A-1)
(a-1) dimethylpolysiioxane capped with dimethylvinylsiloxy at both ends of the molecular chain, vinyl content 0.00015 mol/g, viscosity 600 mPa·s
(a-2) dimethylpolysiloxane capped with trivinylsiloxy at both ends of the molecular chain, vinyl content 0.000075 mol/g, viscosity 100,000 mPa·s Component (A-2)
(a-3) resinous copolymer consisting of Me$_3$SiO$_{1/2}$ units, ViMe$_2$SiO$_{1/2}$ units and SiO$_2$ units, a molar ratio of (Me$_3$SiO$_{1/2}$+ViMe$_2$SiO$_{1/2}$)/SiO$_2$=0.85, vinyl content 0.0009 mol/g, weight average molecular weight 3,800

Component (B-1)
(b-1) methylhydrogenpolysiloxane having SiH groups at both ends and side chains (degree of polymerization 64, SiH content 0.0112 mol/g, dimethylsiloxane-methylhydrogensiloxane copolymer capped with dimethylhydrogensiloxy at both ends of the molecular chain)
(b-2) methylhydrogenpolysiloxane having SiH groups at both ends and side chains (degree of polymerization 40, SiH content 0.0073 mol/g, dimethylsiloxane-methylhydrogensiloxane copolymer capped with dimethylhydrogansiloxy at both ends of the molecular chain)

Component (B-2)
(b-3) organohydrogenpolysiloxane of the general formula (5);

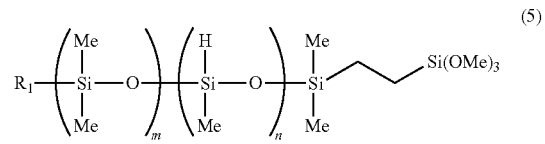

wherein R$_1$=H, m=7.2 (average), and n=2.4 (average).
(b-4) organohydrogenpolysiloxane of the chemical formula (6).

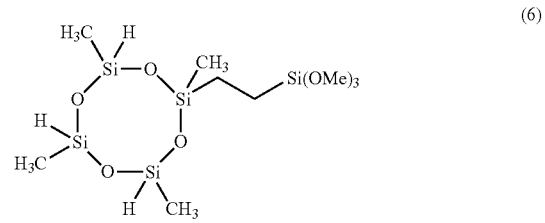

Component (C)
a solution of bis(2,4-pentanedionato)platinum complex in 2-(2-butoxyethoxy)ethyl acetate (concentration 1 wt %)

Component (D)
organopolyslloxane oligomer consisting of MeSiO$_{3/2}$ units and Me$_2$ViSiO units, a molar ratio of MeSiO$_{3/2}$/Me$_2$ViSiO=1/1, alkenyl content 0.0054 mol/g, viscosity 24 mPa·s EXAMPLES 1 to 4 and COMPARATIVE EXAMPLES 1 to 4

UV-curable silicone compositions were prepared by mixing amounts of components as shown in Table 1 until uniform, A droplet (0.05 g) of each composition was dropped on a polytetrafluoroethylene film, and a glass plate of 3 mm thick was rested thereon. The composition was cured at room temperature (25° C.) by irradiating UV radiation at 250 mW/cm$^2$ for 0.8 second from above. The adhesion of the cured composition to glass was examined.

Separately, the composition was cast into a frame and cured by irradiating UV radiation at 250 mW/cm$^2$ for 0.8 second, into a cured sheet of 2 mm thick. The hardness of the sheet was measured. The results are shown in Table 1.

In Table 1, H(B-1)/Vi designates a molar ratio of silicon-bonded hydrogen in component (B-1) to vinyl in components (A) and (D); H(B-2)/Vi designates a molar ratio of silicon-bonded hydrogen in component (B-2) to vinyl in components (A) and (D); H(total)/Vi designates a molar ratio of silicon-bonded hydrogen in components (B-1) and (B-2) to vinyl in components (A) and (D); and Vi(D)/[(A)+(D)] designates a molar ratio of total vinyl in component (D) to total vinyl in components (A) and (D).

TABLE 1

| Component (pbw) | | Example 1 | 2 | 3 | 4 | Comparative Example 1 | 2 | 3 | 4 |
|---|---|---|---|---|---|---|---|---|---|
| (A-1) | a-1 | 60 | 60 | 60 | 60 | 60 | 60 | 60 | 60 |
| | a-2 | 20 | 20 | 20 | 20 | 20 | 20 | 20 | 20 |
| (A-2) | a-3 | 20 | 20 | 20 | 20 | 20 | 20 | 20 | 20 |
| (B-1) | b-1 | 6.6 | 4.8 | | 6.6 | | 8.5 | 5.4 | 21.4 |
| | b-2 | | | 5.0 | | 4.8 | | | |
| (B-2) | b-3 | 6.2 | 7.4 | 5.0 | | 5.5 | | | 20.1 |
| | b-4 | | | | 2.9 | | | | |
| (C) | | 0.72 | 0.72 | 0.72 | 0.72 | 0.72 | 0.72 | 0.72 | 1.00 |
| (D) | | 3.0 | 3.0 | 1.3 | 3.0 | | 3.0 | | 20 |
| H(B-1)/V1 | | 1.7 | 1.2 | 1.1 | 1.7 | 1.3 | 2.2 | 2.2 | 1.8 |
| H(B-2)/V1 | | 0.4 | 0.5 | 0.4 | 0.5 | 0.6 | | | 0.4 |
| H(total)/V1 | | 2.1 | 1.7 | 1.5 | 2.2 | 1.9 | 2.2 | 2.2 | 2.2 |
| V1(D)/[(A)+(D)] | | 0.37 | 0.37 | 0.20 | 0.37 | 0.00 | 0.37 | 0.00 | 0.80 |
| Adhesion | | O | O | O | O | X | X | X | X |
| Hardness | after 6 hours | 50 | 30 | 19 | 43 | 37 | 52 | 44 | unmeasurable |
| | after 2 days | 53 | 49 | 42 | 48 | 37 | 58 | 48 | unmeasurable |

Test, Measurement, Evaluation

The methods for testing, measuring and evaluating the hardness of cured silicone are described below. The curable silicone composition was cured upon exposure to UV radiation at 250 mw/cm$^2$ for 0.8 second (dose=200 mJ/cm$^2$), obtaining a cured sheet of 2 mm thick. Three sheets were stacked and aged for a certain time (6 hours, 2 days). The hardness of the sheet stack was measured by Type A Durometer according to JIS K-6253.

Adhesion to glass was rated good (O) or poor (x).

Japanese Patent Application No. 2013-229244 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A UV-curable, adhesive organopolysiloxane composition comprising
   (A) (A-1) 50 to 90% by weight, based on component (A), of a linear organopolysiloxane having at least two silicon-bonded alkenyl groups per molecule and (A-2) 10 to 50% by weight, based on component (A), of a three-dimensional network organopolysiloxane resin comprising $R^1_2R^2SiO_{1/2}$ units, $R^1_3SiO_{1/2}$ units and $SiO_2$ units, wherein $R^1$ is an unsubstituted or halo-substituted monovalent hydrocarbon group exclusive of alkenyl and $R^2$ is an alkenyl group, in a molar ratio ($R^1_2R^2SiO_{1/2}$+$R^1_3SiO_{1/2}$)/$SiO_2$ of 0.5/1 to 1.5/1, and containing $5×10^{-3}$ $1×10^{-4}$ mol/g of alkenyl groups, the sum of components (A-1) and (A-2) being 100% by weight.
   (B) (B-1) an organohydrogenpolysiloxane containing at least two silicon-bonded hydrogen atoms per molecule, but not alkoxy group, in an amount to give a molar ratio of silicon-bonded hydrogen in component (B-1) to the total of alkenyl in components (A) and (D) of 0.1/1 to 5.0/1, and (B-2) an organohydrogenpolysiloxane containing at least one trialkoxysilyl group bonded to silicon via an alkylene group and at least one silicon-bonded hydrogen atom per molecule, in an amount to give a molar ratio of silicon-bonded hydrogen in component (B-2) to the total of alkenyl groups in components (A) and (D) of 0.05/1 to 2.0/1, with the proviso that a molar ratio of silicon-bonded hydrogen in component (B) to the total of alkenyl in components (A) and (D) is from 0.5/1 to 7.0/1,
   (C) an effective amount of a photoactive platinum complex catalyst, and
   (D) a branched organopolysiloxane oligomer comprising $R^1_2R^2SiO_{1/2}$ units and $R^1SiO_{3/2}$ units, $R^1_2R^2SiO_{1/2}$ units and $R^1SiO_{3/2}$ units, but not $SiO_2$ units, wherein $R^1$ is an unsubstituted or halo-substituted monovalent hydrocarbon group exclusive of alkenyl and $R^2$ is an alkenyl group, and containing at least two alkenyl groups per molecule, in an amount to give a molar ratio of alkenyl in component (D) to the total of alkenyl in components (A) and (D) of 0.1/1 to 0.6/1.

2. The composition of claim 1 wherein the photoactive platinum complex catalyst is a β-diketons platinum complex or a platinum complex having a cyclic diene compound as ligand.

3. The composition of claim 1 wherein the photoactive platinum complex catalyst is one or more members selected from the group consisting of
   trimethyl(acetylacetonato)platinum complex,
   trimethyl (2,4-pentanedionate) platinum complex,
   trimethyl(3,5-heptanedionate)platinum complex,
   trimethyl (methylacetoacetate)platinum complex,
   bis(2,4-pentanedionato)platinum complex,
   bis(2,4-hexanedionato)platinum complex,
   bis(2,4-heptanedionate)platinum complex,
   bis(3,5-heptanedionato)platinum complex,
   bis(1-phenyl-1,3-butanedionato)platinum complex,
   bis(1,3-diphenyl-1,3-propanedionato)platinum complex,
   (1,5-cyclooctadienyl)dimethyl platinum complex,
   (1,5-cyclooctadienyl)diphenyl platinum complex,
   (1,5-cyclooctadienyl)dipropyl platinum complex,
   (2,5-norbornadiene)dimethyl platinum complex,
   (2,5-norbornadiene)diphenyl platinum complex,
   (cyclopentadienyl)dimethyl platinum complex,
   (methylcyclopentadlenyl)diethyl platinum complex,
   (trimethylsilyloycyclopentadienyl)diphenyl platinum complex,
   (methylcycloocta-1,5-dienyl)diethyl platinum complex,
   (cyclopentadienyl)trimethyl platinum complex,
   (cyclopentadienyl)ethyldimethyl platinum complex,
   (cyclopentadienyl)acetyldimethyl platinum complex,
   (methylcyclopentadienyl)trimethyl platinum complex,
   (methylcyclopentadienyl)trihexyl platinum complex, (trimethylsilylcyclopentadienyl) trimethyl platinum complex, (dimethylphenylsilylcyclopentadienyl) triphenyl platinum complex, and (cyclopentadienyl)dimethyltrimethylsilylmethyl platinum complex.

4. The composition of claim 1 which is to form Fresnel lenses for concentrator solar power systems.

5. The composition of claim 1 which is to be cured and bonded to a glass substrate.

6. A. Fresnel lens for concentrator solar power systems comprising a glass substrate and the UV-curable adhesive organopolysiloxane composition of claim 1 cured and bonded to the substrate.

* * * * *